(No Model.)
R. KEITH.
EGG CARRIER.
No. 325,936.   Patented Sept. 8, 1885.
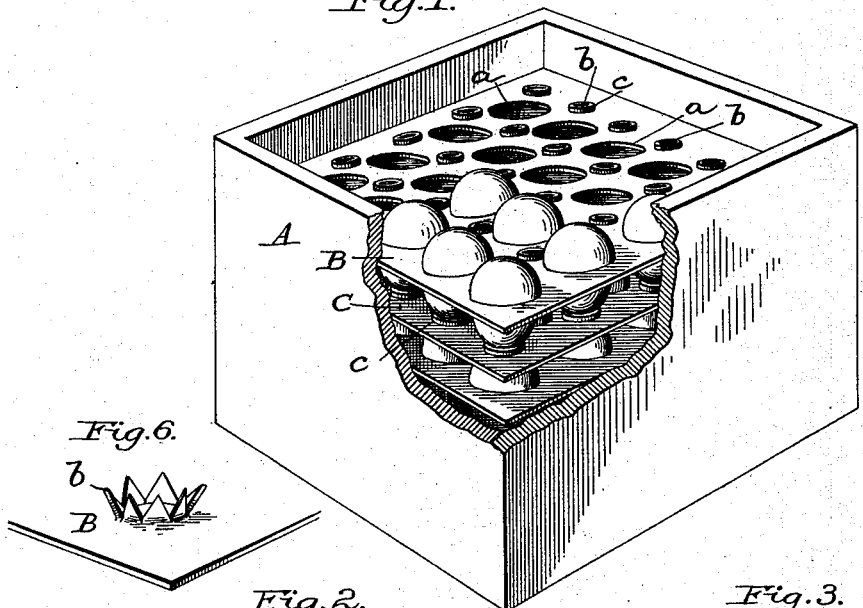
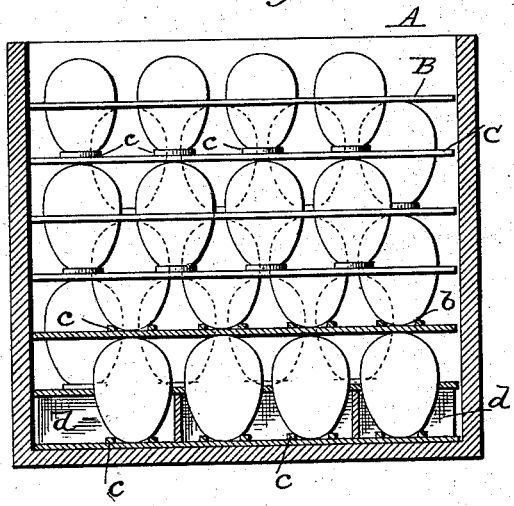
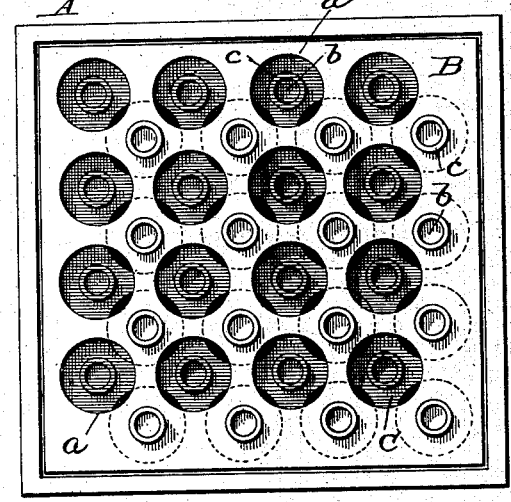
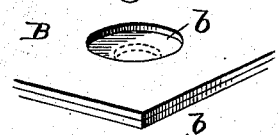
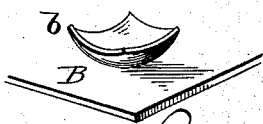
Witnesses:
James F. DuHamel
Walter S. Dodge
Inventor:
Reuel Keith,
by Dodge & Son,
his Attys.
N. PETERS. Photo-Lithographer, Washington, D. C.

UNITED STATES PATENT OFFICE.

REUEL KEITH, OF WASHINGTON, DISTRICT OF COLUMBIA.

EGG-CARRIER.

SPECIFICATION forming part of Letters Patent No. 325,936, dated September 8, 1885.

Application filed July 15, 1885. (No model.)

*To all whom it may concern:*

Be it known that I, REUEL KEITH, of Washington, in the District of Columbia, have invented certain new and useful Improvements in Egg-Carriers, of which the following is a specification.

This invention relates to an egg-carrier composed of a series of sheets or trays of cardboard, straw-board, or like material, each provided with seats or sockets to receive the points of one tier of eggs, and with intermediate openings of a size to receive and support or steady the bodies of the eggs of another tier, each tray or sheet resting upon and being supported by the eggs of the tier next below.

In the drawings annexed, Figure 1 is a perspective view of a case embodying my invention; Fig. 2, a view showing the outer case and two lower trays in section; Fig. 3, a top plan view; and Figs. 4, 5, and 6, views of several forms of the socket or seat for the points of the eggs.

Prior to this invention egg cases or carriers have been made with a series of trays having openings to receive the bodies of the eggs, and elastic strips arranged to support the trays and to bear against and support the sides of the eggs passing through said openings. Others have been made with a series of depressions in the trays alternately in opposite faces thereof, in which depressions the ends of the eggs were seated, the eggs thus serving in some cases to support the trays above them. These constructions, being old and well known, are of course not claimed.

My invention, though bearing certain resemblances to both of these plans, differs materially from each, as will be readily seen by referring to the drawings and from the following description.

The trays, with their contents, are designed to be used in an outer casing or box, which may be of any form and of any convenient or suitable dimensions, without cleats, ledges, drawers, or other supports of any kind for the trays. Such a box is indicated by A in Figs. 1, 2, and 3.

B and C indicate trays, which differ from each other only in that the sockets of each are concentric or in alignment with the large openings of the other, as plainly indicated in Figs. 1 and 2, and by dotted lines in Fig. 3, in which $a$ indicates the holes through which the eggs are passed, and $b$ the socket in which the points rest.

The sockets $b$ may be made in a variety of ways; but the plan preferred is to glue or cement a ring, $c$, of straw-board or other suitable material to the face of the tray at the required point, as shown in Figs. 1, 2, and 3. This plan is simple, cheap, and efficient. Instead of this construction, however, I propose in some cases to employ a double thickness of straw-board or like material for the tray, cut a hole in the upper layer of the same size as the interior of ring $c$, and either leave the lower layer imperforate or form a smaller perforation therein, as in Fig. 4; or a cup-shaped piece of card-board may be employed in lieu of the ring, as illustrated in Fig. 5; or, finally, a series of radial slits or cuts may be made in the card-board where the socket is to be formed, and the lips thus formed may be turned up, as in Fig. 6, thereby forming a socket which will support the point of the egg without permitting it to pass through the same far enough to touch the egg immediately below, which latter will enter the under side of the socket or opening thus formed and will be steadied thereby.

The above description is based upon the well-established custom of carrying eggs with their points down.

The trays, being thus formed, are arranged as shown in Figs. 1 and 2, the first resting directly on the bottom of the box, and the next supported by cross-strips or corrugated strips of paper set on edge, as shown at $d$ in Fig. 2, by strips of wood around the inner walls of the box, by hollow cylinders of straw-board, or in any equivalent manner. Eggs are then passed through the holes $a$ of the second tray, which holes are of a size to admit the eggs freely and serve only to support them against lateral displacement, and their points are seated in the sockets $b$ of the bottom tray. Another tray is then laid directly upon the upper ends of the first tier of eggs, and supplied with eggs in the same manner as the preceding one, and so on until the box is filled, a sheet of straw-board, paper, or other material being placed on the top layer, and the cover of the box being then applied.

It will thus be seen that with the exception of the tray next to the bottom no support for the trays is required other than the eggs themselves and the bottom of the box.

Having thus described my invention, what I claim is—

1. In combination with a suitable containing-box, a series of trays, each provided with a series of holes to receive the bodies of the eggs, and with sockets or seats to receive and support the ends of other eggs, the sockets of each tray being in line with the holes of the next.

2. The combination, in an egg-carrier, of trays B C, each formed with a series of holes, $a$, of a size to receive the bodies of eggs, and with a series of sockets, $b$, alternating with the holes $a$, and adapted to receive and retain the ends of eggs, whereby the eggs are held in an upright position, and the eggs of each tray are caused to support those of the trays above.

3. The combination of two or more trays, B C, each tray provided with a series of holes, $a$, of a size to receive the bodies of eggs, and with intermediate rings, $c$, cemented or otherwise secured to the trays between the holes $a$.

4. In combination with a suitable box, a series of trays provided with sockets to receive the points of one tier of eggs, and with holes to receive the bodies of another tier of eggs, and supporting-strips placed between the bottom and the next tray, substantially as and for the purpose explained.

REUEL KEITH.

Witnesses:
WILLIAM W. DODGE,
JAMES F. DU HAMEL.